US012585521B2

(12) United States Patent
Parmar et al.

(10) Patent No.: US 12,585,521 B2
(45) **Date of Patent: \*Mar. 24, 2026**

(54) DEGRADED AVAILABILITY ZONE REMEDIATION FOR MULTI-AVAILABILITY ZONE CLUSTERS OF HOST COMPUTERS

(71) Applicant: VMware, Inc., Palo Alto, CA (US)

(72) Inventors: Piyush Parmar, Bangalore (IN); Pawan Saxena, Palo Alto, CA (US); Gabriel Tarasuk-Levin, Sunnyvale, CA (US); Dhaval Shah, Bangalore (IN); Umesha Margi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/380,576

(22) Filed: Oct. 16, 2023

(65) Prior Publication Data

US 2024/0036961 A1 Feb. 1, 2024

Related U.S. Application Data

(63) Continuation of application No. 17/548,635, filed on Dec. 13, 2021, now Pat. No. 11,789,800.

(30) Foreign Application Priority Data

Oct. 1, 2021 (IN) .............................. 202141044762

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/2041* (2013.01); *G06F 11/3006* (2013.01); *G06F 11/3072* (2013.01)

(58) Field of Classification Search
CPC ............ G06F 11/1076; G06F 11/1451; G06F 11/1464; G06F 11/2094; G06F 11/2097;
(Continued)

(56) References Cited

U.S. PATENT DOCUMENTS 8,010,829 B1 * 8/2011 Chatterjee ........... G06F 11/2094
714/4.11
2014/0047264 A1 * 2/2014 Wang .................... G06F 11/143
714/4.11
(Continued)

*Primary Examiner* — Charles Ehne
(74) *Attorney, Agent, or Firm* — King Intellectual Asset Mangement

(57) ABSTRACT

System and computer-implemented method for managing multi-availability zone (AZ) clusters of host computers in a cloud computing environment automatically detects a degraded state of a first AZ in the cloud computing environment based on host failure events for host computers in a first cluster section of a multi-AZ cluster of host computers located in the first AZ and a recovered state of the first AZ based a successful scale-in operation of another multi-AZ cluster located partially in the first AZ. In response to the detection of the degraded state of the first AZ, a second cluster section of the multi-AZ cluster of host computers located in a second AZ is scaled out. In response to the detection of the recovered state of the first AZ, the second cluster section of the multi-AZ cluster of host computers located in the second AZ is scaled in.

20 Claims, 12 Drawing Sheets

(51) Int. Cl.
  *G06F 11/20* (2006.01)
  *G06F 11/30* (2006.01)

(58) Field of Classification Search
  CPC ............. G06F 11/1425; G06F 11/1469; G06F
         11/0709; G06F 11/1662; G06F 11/2092;
                          G06F 11/2023
  See application file for complete search history.

(56) References Cited

U.S. PATENT DOCUMENTS

| 2016/0366220 A1* | 12/2016 | Gottlieb ................... H04L 69/40 |
| 2017/0286518 A1* | 10/2017 | Horowitz ............ G06F 16/2365 |
| 2017/0316078 A1* | 11/2017 | Funke ................. H04L 67/1008 |
| 2019/0342149 A1* | 11/2019 | Guo .................... H04L 67/1059 |
| 2020/0236159 A1* | 7/2020 | Shang ................. H04L 41/5025 |

* cited by examiner

200

Logical Network Manager 224

Virtualization Manager 226

Cluster 202

Host 204A

VM 218    VM 218    · · ·

Hypervisor 220    LNA 222    HAA 228    LS 230

Hardware Platform 206

CPU 208    Memory 210    Network Interface 212    Storage 214

Host 204B

· · ·

VM 218    VM 218

Hypervisor 220    LNA 222    HAA 228    LS 230

Hardware Platform 206

CPU 208    Memory 210    Network Interface 212    Storage 214 vSAN 216

Primary Availability Zone AZ1

Secondary Availability Zone AZ2

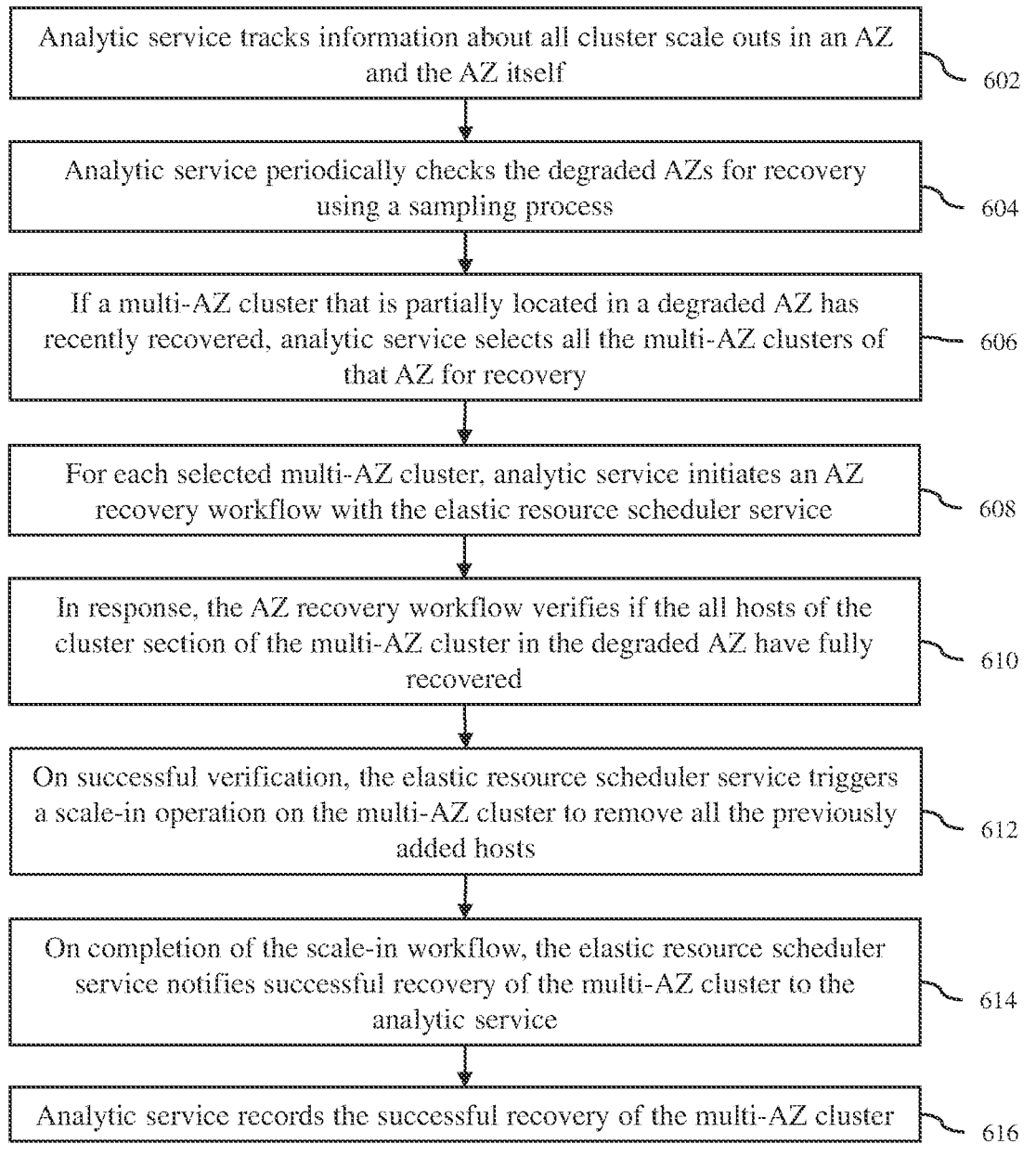

Analytic service tracks information about all cluster scale outs in an AZ and the AZ itself — 602

Analytic service periodically checks the degraded AZs for recovery using a sampling process — 604

If a multi-AZ cluster that is partially located in a degraded AZ has recently recovered, analytic service selects all the multi-AZ clusters of that AZ for recovery — 606

For each selected multi-AZ cluster, analytic service initiates an AZ recovery workflow with the elastic resource scheduler service — 608

In response, the AZ recovery workflow verifies if the all hosts of the cluster section of the multi-AZ cluster in the degraded AZ have fully recovered — 610

On successful verification, the elastic resource scheduler service triggers a scale-in operation on the multi-AZ cluster to remove all the previously added hosts — 612

On completion of the scale-in workflow, the elastic resource scheduler service notifies successful recovery of the multi-AZ cluster to the analytic service — 614

Analytic service records the successful recovery of the multi-AZ cluster — 616

FIG. 6

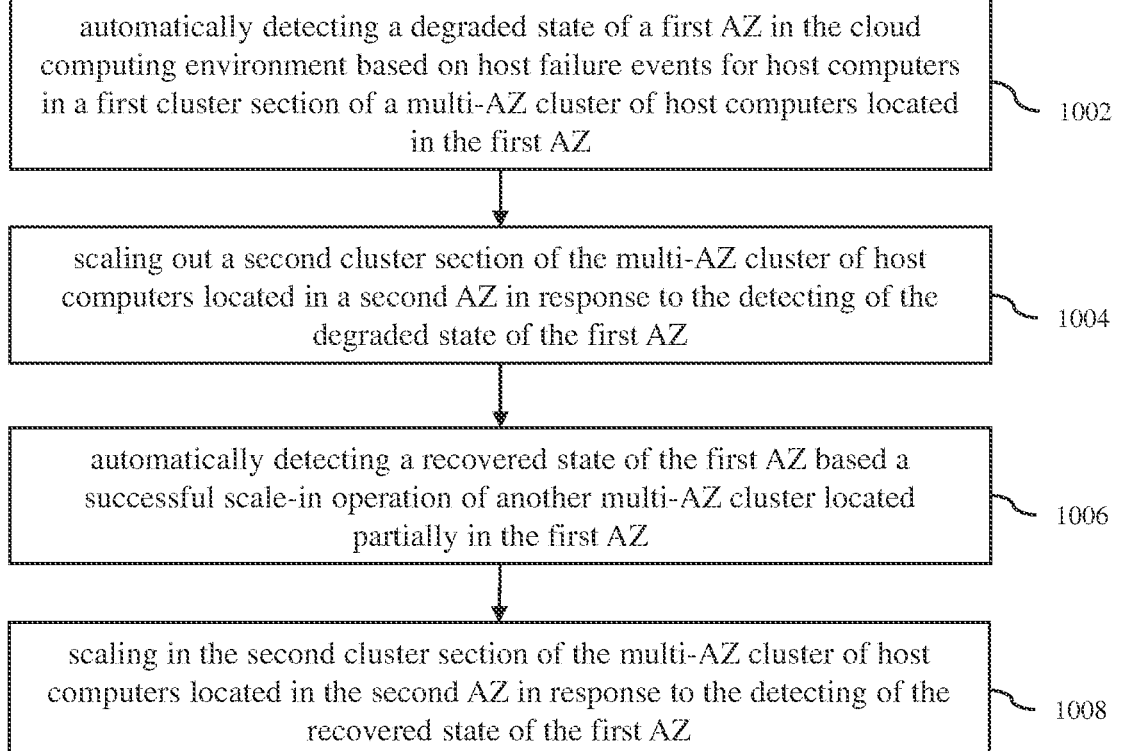

automatically detecting a degraded state of a first AZ in the cloud computing environment based on host failure events for host computers in a first cluster section of a multi-AZ cluster of host computers located in the first AZ                1002 scaling out a second cluster section of the multi-AZ cluster of host computers located in a second AZ in response to the detecting of the degraded state of the first AZ                1004 automatically detecting a recovered state of the first AZ based a successful scale-in operation of another multi-AZ cluster located partially in the first AZ                1006 scaling in the second cluster section of the multi-AZ cluster of host computers located in the second AZ in response to the detecting of the recovered state of the first AZ                1008

FIG. 10

DEGRADED AVAILABILITY ZONE REMEDIATION FOR MULTI-AVAILABILITY ZONE CLUSTERS OF HOST COMPUTERS

RELATED APPLICATIONS

This application is a continuation, which claims priority from U.S. patent application Ser. No. 17/548,625, filed on Dec. 13, 2021, issued as U.S. Pat. No. 11,789,800, which claims benefit under 35 U.S.C. 119(a)-(d) to Foreign Application Serial No. 202141044762 filed in India on Oct. 1, 2021, which are both herein incorporated by reference in their entireties for all purposes.

RELATED APPLICATION

Benefit is claimed under 35 U.S.C. 119(a)-(d) to Foreign Application Serial No. 202141044762 filed in India entitled "DEGRADED AVAILABILITY ZONE REMEDIATION FOR MULTI-AVAILABILITY ZONE CLUSTERS OF HOST COMPUTERS", on Oct. 1, 2021, by VMware, Inc., which is herein incorporated in its entirety by reference for all purposes.

BACKGROUND

Various computing architectures can be deployed in a public cloud as a cloud service. For example, one or more software-defined data centers (SDDCs) may be deployed for an entity or customer in a public cloud via a cloud service provider, where each SDDC may include one or more clusters of host computers. Some public clouds offer multiple availability zones (AZs), where each AZ includes one or more data centers with redundant power, networking and connectivity in a geographical region, which allow SDDCs to be deployed across multiple AZs for higher availability and fault tolerance.

One concern with multi-AZ SDDCs is that, if an AZ becomes degraded, e.g., a partial or complete failure, the affected software components of a multi-AZ SDDC running in that AZ should be moved to another AZ, which requires detection and remediation. However, there are no known solutions to detect degraded AZs and current remediation solutions may not efficiently support the migration of affected software components of a multi-AZ SDDC from the degraded AZ to another AZ.

SUMMARY

System and computer-implemented method for managing multi-availability zone (AZ) clusters of host computers in a cloud computing environment automatically detects a degraded state of a first AZ in the cloud computing environment based on host failure events for host computers in a first cluster section of a multi-AZ cluster of host computers located in the first AZ and a recovered state of the first AZ based a successful scale-in operation of another multi-AZ cluster located partially in the first AZ. In response to the detection of the degraded state of the first AZ, a second cluster section of the multi-AZ cluster of host computers located in a second AZ is scaled out. In response to the detection of the recovered state of the first AZ, the second cluster section of the multi-AZ cluster of host computers located in the second AZ is scaled in.

A computer-implemented method for managing multi-AZ clusters of host computers in a cloud computing environment comprises automatically detecting a degraded state of a first AZ in the cloud computing environment based on host failure events for host computers in a first cluster section of a multi-AZ cluster of host computers located in the first AZ, scaling out a second cluster section of the multi-AZ cluster of host computers located in a second AZ in response to the detecting of the degraded state of the first AZ, automatically detecting a recovered state of the first AZ based a successful scale-in operation of another multi-AZ cluster located partially in the first AZ, and scaling in the second cluster section of the multi-AZ cluster of host computers located in the second AZ in response to the detecting of the recovered state of the first AZ. In some embodiments, the steps of this method are performed when program instructions contained in a computer-readable storage medium are executed by one or more processors.

A system in accordance with an embodiment of the invention comprises memory and at least one processor configured to automatically detect a degraded state of a first AZ in a cloud computing environment based on host failure events for host computers in a first cluster section of a multi-AZ cluster of host computers located in the first AZ, scale out a second cluster section of the multi-AZ cluster of host computers located in a second AZ in response to the detecting of the degraded state of the first AZ, automatically detect a recovered state of the first AZ based a successful scale-in operation of another multi-AZ cluster located partially in the first AZ, and scale in the second cluster section of the multi-AZ cluster of host computers located in the second AZ in response to the detecting of the recovered state of the first AZ.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6 is a flow diagram of an AZ recovery detection and scale-in process executed by the cloud management system in accordance with an embodiment of the invention.

FIG. 10 is a process flow diagram of a computer-implemented method for managing multi-AZ clusters of host computers in a cloud computing environment in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
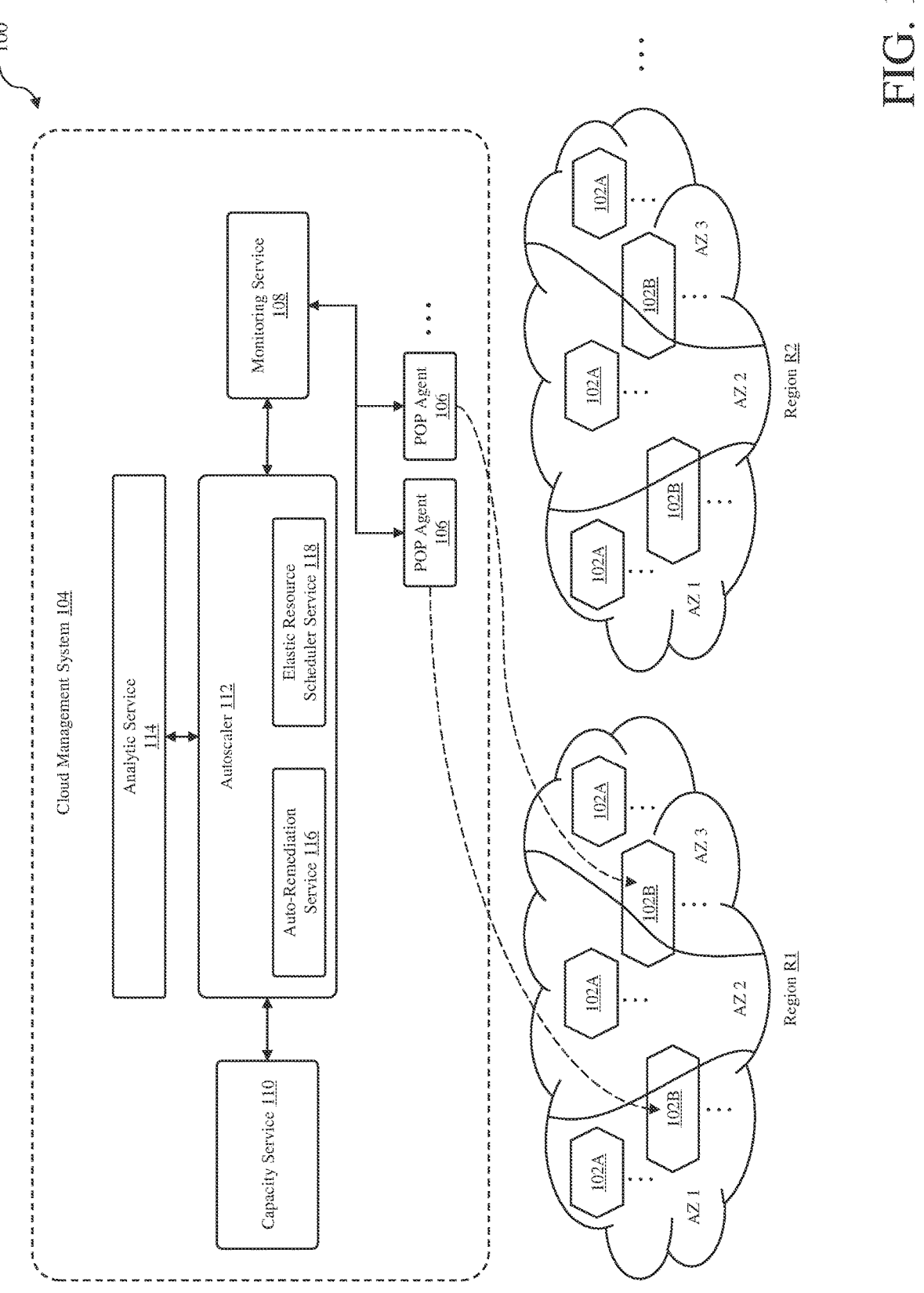
FIG. 1 is a block diagram of a cloud computing environment in accordance with an embodiment of the invention.

Turning now to FIG. 1, a block diagram of a cloud computing environment 100 in accordance with an embodiment of the invention is shown. The cloud computing environment 100 may be a public cloud platform, which allows entities, such as organizations and enterprises, to use the platform to run their applications in separate cloud-based computing environments, which may include one or more software-defined data centers (SDDCs). As illustrated in FIG. 1, the cloud computing environment 100 may include different geographical regions R1 and R2 of physical computing and storage infrastructure in the form of data centers. Each of these regions may include availability zones (AZ) AZ1, AZ2 and AZ3, which are groups of logical data centers. Each AZ may have independent power, cooling and physical security, and may be connected using redundant, ultra-low-latency networks, which allows the use of multiple availability zones for greater availability and fault tolerance. Although only two regions for the cloud computing environment are illustrated in FIG. 1, the cloud computing environment may include more regions. Similarly, although only three (3) AZs for each region are illustrated in FIG. 1, each region may include two (2) AZs or more than three (3) AZs.

In the illustrated embodiment, there are a number of SDDCs 102A and 102B deployed in the regions R1 and R2. Each of these SDDCs represents one cloud-based computing environment, which may be assigned to an entity under an agreement. However, in a single cloud-based computing environment, there may be multiple SDDCs. In a particular implementation, each cloud-based computing environment that includes one or more SDDCs may be a VMware Cloud Organization of a VMware Cloud on AWS (VMC on AWS).

As shown in FIG. 1, the SDDCs 102A in the regions R1 and R2 are single AZ SDDCs, i.e., SDDCs that reside within a single AZ, while the SDDCs 102B are multi-AZ SDDCs, i.e., SDDCs that reside across two or more AZs. In this disclosure, the focus will be on the multi-AZ SDDCs, which are described in more detail below.

Figure 2:
FIG. 2 is a diagram of a multi-availability zone (AZ) software-defined data center (SDDC) that can be deployed in the cloud computing environment shown in FIG. 1 in accordance with an embodiment of the invention.

Turning now to FIG. 2, a multi-AZ SDDC 200 that can be deployed in the cloud computing environment 100, for example, in the region R1, in accordance with an embodiment of the invention is illustrated. As shown in FIG. 2, the multi-AZ SDDC 200 includes a cluster 202 of host computers ("hosts") 204A and 204B. The hosts 204A are located in the primary availability zone AZ1, while the hosts 204B are located in the secondary availability zone AZ2. In an embodiment, the cluster 202 share resources, such as memory, central processing unit (CPU) and storage, and can be managed as a single entity. In some embodiments, the multi-AZ SDDC 200 may include additional clusters of hosts, similar to the cluster 202. In some embodiments, the cluster 202 may include a witness host in another AZ (not shown) to run witness software components.

The hosts 204A and 204B (generally referred to herein as hosts 204) in the cluster 202 may be constructed on a server grade hardware platform 206, such as an x86 architecture platform. In an embodiment, at least some of the hosts may be i3.metal instances. As shown, the hardware platform 206 of each host 204 may include conventional components of a computing device, such as one or more processors (e.g., CPUs) 208, system memory 210, a network interface 212, and storage 214. The processor 208 can be any type of a processor commonly used in servers. The memory 210 is volatile memory used for retrieving programs and processing data. The memory 210 may include, for example, one or more random access memory (RAM) modules. The network interface 212 enables the host to communicate with other devices that are inside or outside of the multi-AZ SDDC 200. The network interface 212 may be one or more network adapters, also referred to as a Network Interface Card (NIC). The storage 214 represents one or more local storage devices (e.g., one or more hard disks, flash memory modules, solid state disks and optical disks), which may be used together with storages from other hosts in the same cluster to form a virtual storage area network (vSAN) 216.

Each host 204 may be configured to provide a virtualization layer that abstracts processor, memory, storage and networking resources of the hardware platform 206 into the virtual computing instances, e.g., virtual machines 218, that run concurrently on the same host. The virtual machines 218 run on top of a software interface layer, which is referred to herein as a hypervisor 220, that enables sharing of the hardware resources of the host by the virtual machines. One example of the hypervisor 220 that may be used in an embodiment described herein is a VMware ESXi™ hypervisor provided as part of the VMware vSphere® solution made commercially available from VMware, Inc. The hypervisor 220 may run on top of the operating system of the host or directly on hardware components of the host. For other types of virtual computing instances, the host may include other virtualization software platforms to support those virtual computing instances, such as Docker virtualization platform to support "containers".

In the illustrated embodiment, the hypervisor 220 includes a logical network agent (LNA) 222, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the multi-AZ SDDC 200. The logical network agent 222 receives configuration information from a logical network manager 224 (which may include a control plane cluster) and, based on this information, populates forwarding, firewall and/or other action tables for dropping or directing packets between the virtual machines 218 in the host 204 and other virtual computing instances on other hosts, as well between the virtual machines 218 in the host 204 and devices outside of the multi-AZ SDDC 200. Collectively, the logical network agent 222, together with other agents on other hosts, according to their forwarding/routing tables, implement isolated overlay networks that can connect arbitrarily selected virtual machines or other virtual computing instances with each other. Each virtual machine or virtual computing instance may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 222 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The multi-AZ SDDC 200 also includes a virtualization manager 226 that manages the cluster 202 of hosts 204. In an embodiment, the virtualization manager 226 is a computer program that resides and executes in a computer system, such as one of the hosts 204, or in a virtual computing instance, such as one of the virtual machines 218 running on the hosts 204. One example of the virtualization manager 226 is the VMware vCenter Server® product made available from VMware, Inc. Thus, the cluster of hosts may be a vSphere cluster. The virtualization manager 226 is configured to carry out administrative tasks for the cluster of hosts in the multi-AZ SDDC 200, which may include monitoring resource utilizations (e.g., CPU, memory and storage utilizations) in the cluster, managing the hosts in the cluster, managing the virtual machines running on the hosts in the cluster, provisioning virtual machines, migrating virtual machines from one host to another host, and load balancing between the hosts in the cluster.

As noted above, the multi-AZ SDDC 200 also includes the logical network manager 224 (which may include a control plane cluster), which operates with the logical network agents 222 in the hosts 204 to manage and control logical overlay networks in the multi-AZ SDDC. Logical overlay networks comprise logical network devices and connections that are mapped to physical networking resources, e.g., switches and routers, in a manner analogous to the manner in which other physical resources as compute and storage are virtualized. In an embodiment, the logical network manager 224 has access to information regarding physical components and logical overlay network components in the multi-AZ SDDC. With the physical and logical overlay network information, the logical network manager 224 is able to map logical network configurations to the physical network components that convey, route, and filter physical traffic in the multi-AZ SDDC 200. In one particular implementation, the logical network manager 224 is a VMware NSX™ manager running on any computer, such as one of the hosts 204 or a virtual machine 218 in the multi-AZ SDDC.

In the illustrated embodiment, the hypervisor 220 further includes a high availability (HA) agent (HAA) 228 and a local scheduler (LS) 230. The HA agent in the hypervisor in each of the hosts 204A and 204B of the multi-AZ SDDC 200 facilitate the high availability feature of the cluster 202. The HA agents monitor the hosts and the virtual computing instances, e.g., virtual machines, running on the hosts to detect hardware and guest operating system failures. When failures are detected, the HA feature may migrate the affected virtual machines to other hosts in the cluster. In a particular implementation, the HA agents enable the VMware vSphere® High Availability solution.

The local scheduler 230 in the hypervisor 220 in each of the hosts 204A and 204B of the multi-AZ SDDC 200 facilitate the resource scheduler feature of the cluster 202. The local schedulers are part of a distributed resource scheduler solution that provides highly available resources to workloads running on the hosts. In addition, the distributed resource scheduler solution balances workloads across the different hosts for optimal performance. The distributed resource scheduler solution also scales and manages computing resources without service disruption. In a particular implementation, the local schedulers enable the VMware vSphere® Distributed Resource Scheduler™ solution.

As shown in FIG. 2, in this embodiment, the logical network manager 224 and the virtualization manager 226, which are management components of the multi-AZ SDDC 200, are located in the primary availability zone AZ1. However, in other embodiments, the logical network and virtualization managers 224 and 226, may be located in the secondary availability zone AZ2, or located in both the primary availability zone AZ1 and the secondary availability zone AZ2. In addition, in other embodiments, the multi-AZ SDDC 200 may include other additional management components.

Since the components of the multi-AZ SDDC 200 reside in different AZs, there is a need for remediation when one of the AZs becomes degraded, i.e., partial or complete AZ failure, which may cause at least some of the hosts in the degraded AZ to fail, or otherwise become nonoperational. As described below, the cloud computing environment 100 uses components and methodologies to resolve various issues regarding degraded AZs with respect to multi-AZ SDDCs deployed in the cloud computing environment.

Turning back to FIG. 1, the cloud computing environment 100 includes a cloud management system 104, which supports and manage the SDDCs 102A and 102B in the region R1 of the cloud computing environment. Thus, in this embodiment, other cloud management systems (not shown) would support and manage the SDDCs in other regions, such as the region R2. However, in other embodiments, the cloud management system 104 may support additional regions of the cloud computing environment.

As illustrated, the cloud management system 104 includes a number of point-of-presence (POP) agents 106, a monitoring service 108, a capacity service 110, an autoscaler 112 and an analytic service 114. Each POP agent 106 is installed in one of the SDDCs 102A and 102B to monitor events that occur in the SDDC, including host failure events. In an embodiment, each POP agent 106 installed in a particular SDDC may communicate with the virtualization manager in the SDDC to detect various events. The events detected by the POP agents in the various SDDCs are transmitted to the monitoring service 108.

The monitoring service 108 operates to receive and process the information received from the POP agents 106 in the various SDDCs 102A and 102B. Depending on the information received, the monitoring service may take various actions, including transmitting the received information to different components in the cloud management system 104. As an example, in response to host failure events from a particular SDDC, the monitoring service may request auto-remediation task for the SDDC from the autoscaler 112.

The capacity service 110 operates to monitor the resource capacities of the SDDCs 102A and 102B, such as available compute, memory and/or storage resources. In an embodiment, the resource capacities of the SDDCs 102A and 102B are determined using metrics collected by the POP agents 106. When requested, the capacity service 110 may provide the current resource capacity for any of the SDDCs to the requesting component.

The autoscaler 112 operates to execute auto-remediation and auto-scaling operation via an auto-remediation service 116 and an elastic resource scheduler service 118. The auto-remediation service 116 monitors hardware and software faults, and automatically attempts to remediate the problem by fixing an issue or replacing the hardware. As an example, when hosts fail in a multi-AZ cluster, the auto-remediation service may attempt to provision new replacement hosts in the multi-AZ cluster.

The elastic resource scheduler service 118 operates to automatically scale out and scale in clusters of hosts as needed. A scale-out operation on a cluster is an operation to add resources to the cluster when one or more resource utilizations, e.g., CPU, memory and storage, exceeds scale-out resource utilization thresholds. In an embodiment, a cluster is scaled out when any of the resource utilizations consistently remain above the scale-out resource utilization thresholds. A scale-in operation on a cluster is an operation to remove or release resources from the cluster when one or more resource utilizations, e.g., CPU, memory and storage, fall below scale-in resource utilization thresholds. In an embodiment, a cluster is scaled in when all the resource utilizations are consistently below the scale-in resource utilization thresholds. In an embodiment, the resources that are being removed for scale-in operations and added for scale-out operations are host computers. However, in other embodiments, these resources may be other type of physical resources, such as storage devices, or virtual resources, such as virtual compute, memory and/or storage resources. In an embodiment, the elastic resource scheduler service 118 may perform functions similar to VMware Elastic Distributed Resource Scheduler (EDRS).

The analytic service 114 operates to analyze information received from various components of the cloud management system 104 and initiates appropriate actions. As an example, in response to auto-remediation failure notifications from the auto-remediation service 116, the analytic service 114 may initiate an elastic resource scheduler service workflow for degraded AZ detection, as described below. In addition, the analytic service 114 may monitor all the SDDCs that were scaled out and scaled in, as well as degraded AZs, so that appropriate workflows may be initiated. The analytic service 114 may also record successful recovery of SDDCs when degraded AZs recover, as described below. The functions of the analytic service 114 are further described below.

With respect to AZs, the cloud management system 104 operates to automatically detect a degraded state of an AZ and scale out multi-AZ SDDCs that are partially located in the degraded AZ. In addition, the cloud management system operates to automatically detect a recovered state of the degraded AZ and scale in the multi-AZ SDDCs that are partially located in the recovered AZ. The processes that are involved in these operations are described below.

Figures 3A, 3B:
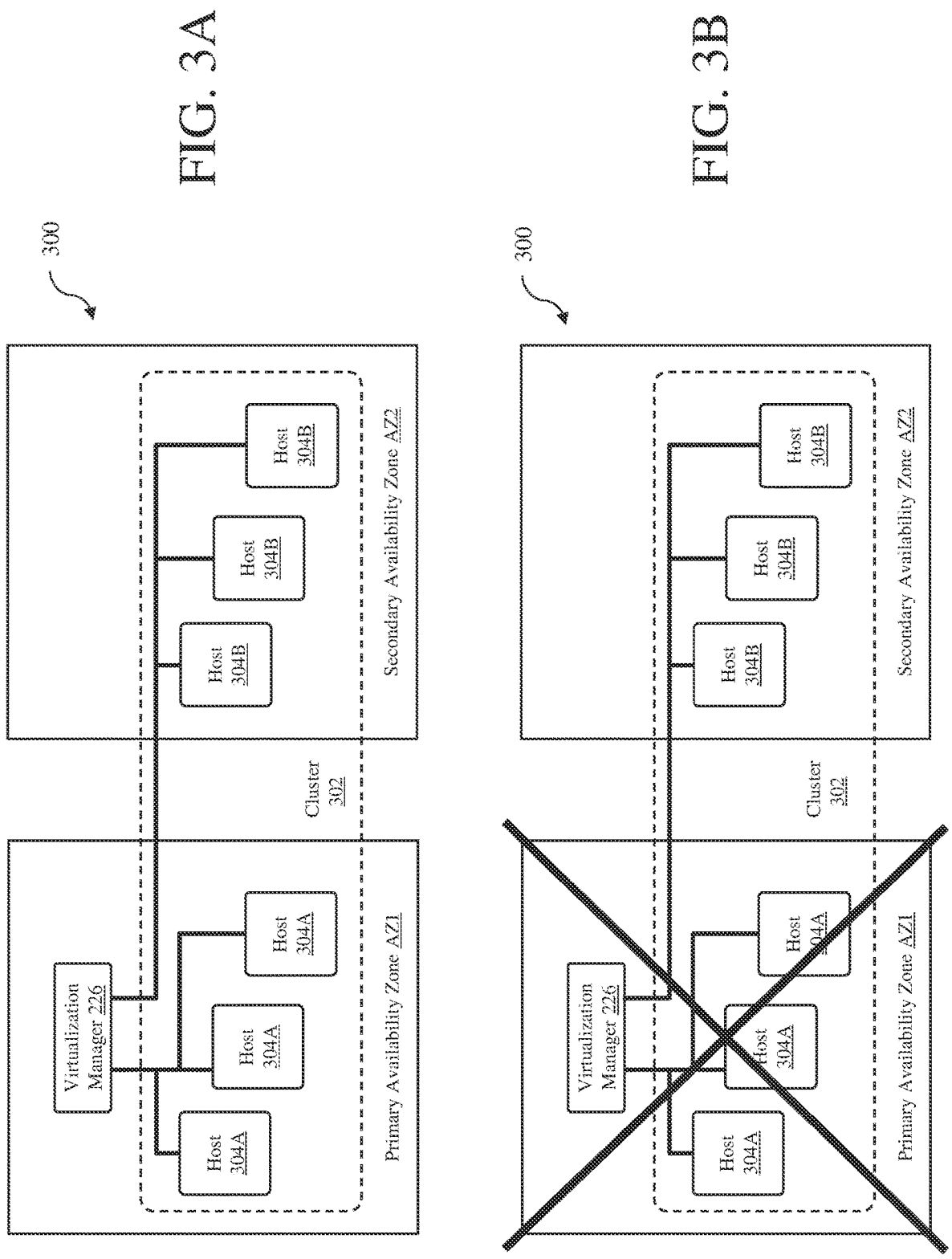
FIGS. 3A-3C illustrate a process of detecting a degraded AZ and scaling out a multi-AZ SDDC due to the degraded AZ in accordance with an embodiment of the invention.
Figure 3C:
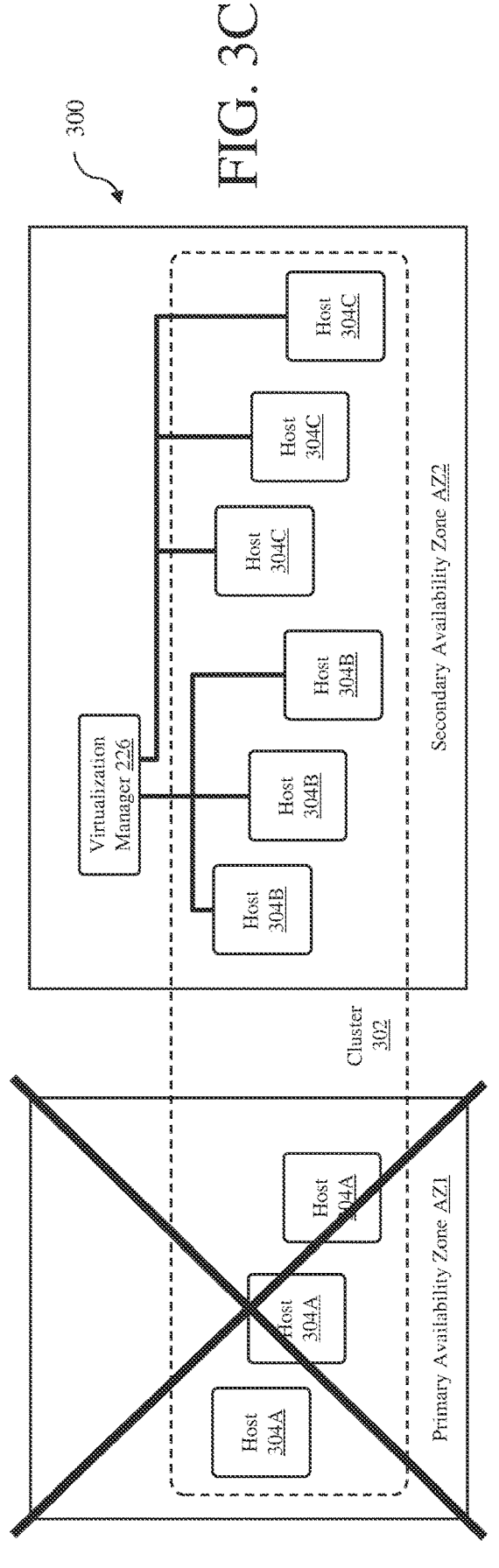

A process of detecting a degraded AZ and scaling out a multi-AZ SDDC due to the degraded AZ in accordance with an embodiment of the invention is described with references to FIGS. 3A-3C. In this description, a multi-AZ SDDC 300 that resides across a primary availability zone AZ1 and a secondary availability zone AZ2 will be used to illustrate the process. As shown in FIG. 3A, the multi-AZ SDDC 300 includes a virtualization manager 326, which is located in the primary availability zone AZ1, and a cluster 302 of six (6) hosts 304A and 304B, some of which are located in the primary availability zone AZ1 and some of which are located in the secondary availability zone AZ2. Specifically, the three (3) host computers 304A are located in the primary availability zone AZ1 and the other three (3) host computers 304B are located in the secondary availability zone AZ2. In this example, other management components, such as a logical network manager, are not shown, which may also reside in the primary availability zone AZ1.

Let's now assume that the primary availability zone AZ1 becomes degraded, e.g., a complete failure due to some sort of outage, as illustrated in FIG. 3B. When the outage at the primary availability zone AZ1 occurs, the auto-mediation service 116 of the autoscaler 112 would try to provision new replacement hosts in the cluster 302 that resides in the primary availability zone AZ1, i.e., a cluster section of the cluster 302 that resides in the primary availability zone AZ1. However, due to the outage at the primary availability zone AZ1, provisioning of new replacement hosts in the primary availability zone AZ1 within the cluster 302 would fail. In addition, the high availability (HA) feature of the hypervisors in the hosts 304A and 304B of the cluster 302 would indicate that the hosts in the primary availability zone AZ1 are all down and cannot communicate with the HA master, which may be one of the hosts in the secondary availability zone AZ2 due to a previous election or new election after the outage. This would immediately initiate a failover event for all the virtual machines, or other virtual computing instances in other embodiments, residing in the primary availability zone AZ1, which includes the virtual machines with management components, to the secondary availability zone AZ2.

If the multi-AZ SDDC 300 is heavily loaded, this sudden influx of virtual machines being powered on in the secondary availability zone AZ2 would eventually exhaust the resources in the secondary availability zone AZ2 for the multi-AZ SDDC. It is also possible that the virtual machines with high reservations (i.e., high resource requirements) may not even be able to power on since the compute capacity may become exhausted.

Such a situation would automatically be detected by the analytic service 114, which would trigger an AZ scale-out event for the elastic resource scheduler service 118. In response, the elastic resource scheduler service would add sufficient number of new hosts to the multi-AZ SDDC 300 in the secondary availability zone AZ2, subject to resource capacity of the secondary availability zone AZ2 for the multi-AZ SDDC. For example, if there is sufficient resources available in the secondary availability zone AZ2 for the multi-AZ SDDC, the elastic resource scheduler service would add an equal number of hosts in the failed primary availability zone AZ1 to the secondary availability zone AZ2 for the multi-AZ SDDC. This is illustrated in FIG. 3C, where three (3) new hosts 304C have been added to the cluster 302 in the secondary availability zone AZ2 by the elastic resource scheduler service. The process of detecting a degraded AZ and scaling out multi-AZ clusters in response to the degraded availability zone is described in more detail below.

After a period of time, which could be in matter of hours, the outage at the primary availability zone AZ1 may be resolved, which would require detecting that the primary availability zone AZ1 has recovered and scaling in the multi-AZ SDDC 300 for the secondary availability zone AZ2, after the virtual machines from the primary availability zone AZ1 are transferred back to the primary availability zone AZ1.

Figures 3D, 3E:
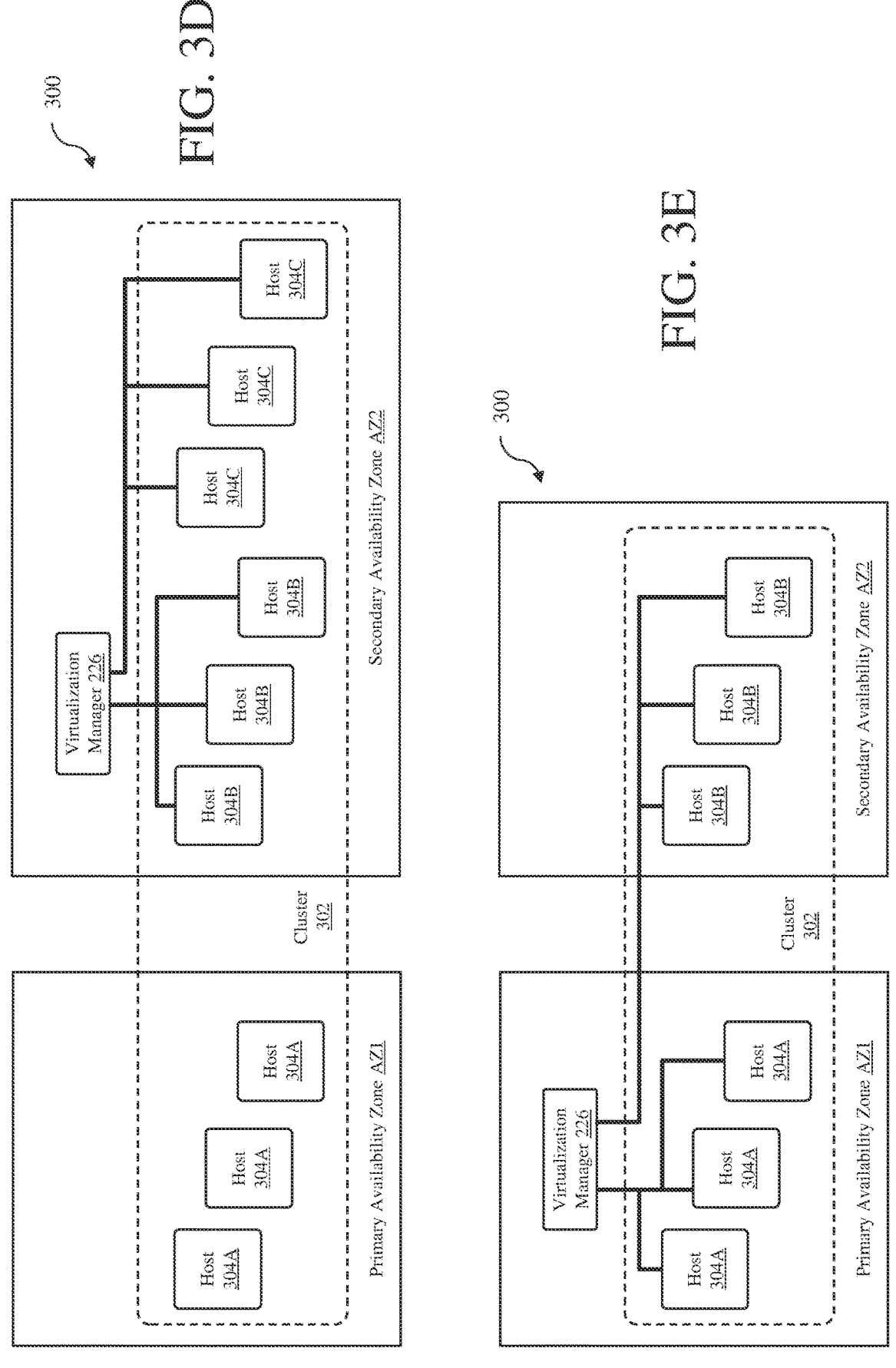
FIGS. 3D and 3E illustrate a process of detecting a recovered AZ and scaling in a multi-AZ SDDC in accordance with an embodiment of the invention.

FIGS. 3D and 3E illustrate the process of detecting a recovered AZ and scaling in a multi-AZ SDDC in accordance with an embodiment of the invention. Let's assume that the failed primary availability zone AZ1 has now recovered, as illustrated in FIG. 3D. As a result, the hosts 304A of the cluster in the availability zone AZ1 will now be available, which allows the distributed resource scheduler feature of the cluster 302 to move or migrate the virtual machines in the secondary availability zone AZ2 that have affinity to the primary availability zone AZ1, including the virtual machines with management components. In response to a successful migration of a virtual machine to a host in the primary availability zone AZ1, the analytic service 114 triggers an AZ recovery task, which instructs the elastic resource scheduler service 118 to make a call to the virtualization manager 326 to verify if the hosts in the primary availability zone AZ1 have now recovered. If so, the elastic resource scheduler service initiates a scale-in operation of the hosts that were previously added to the second availability zone AZ2. The process of detecting a recovered AZ and scaling in multi-AZ SDDCs in response to the recovered AZ is described in more detail below.

Figure 4:
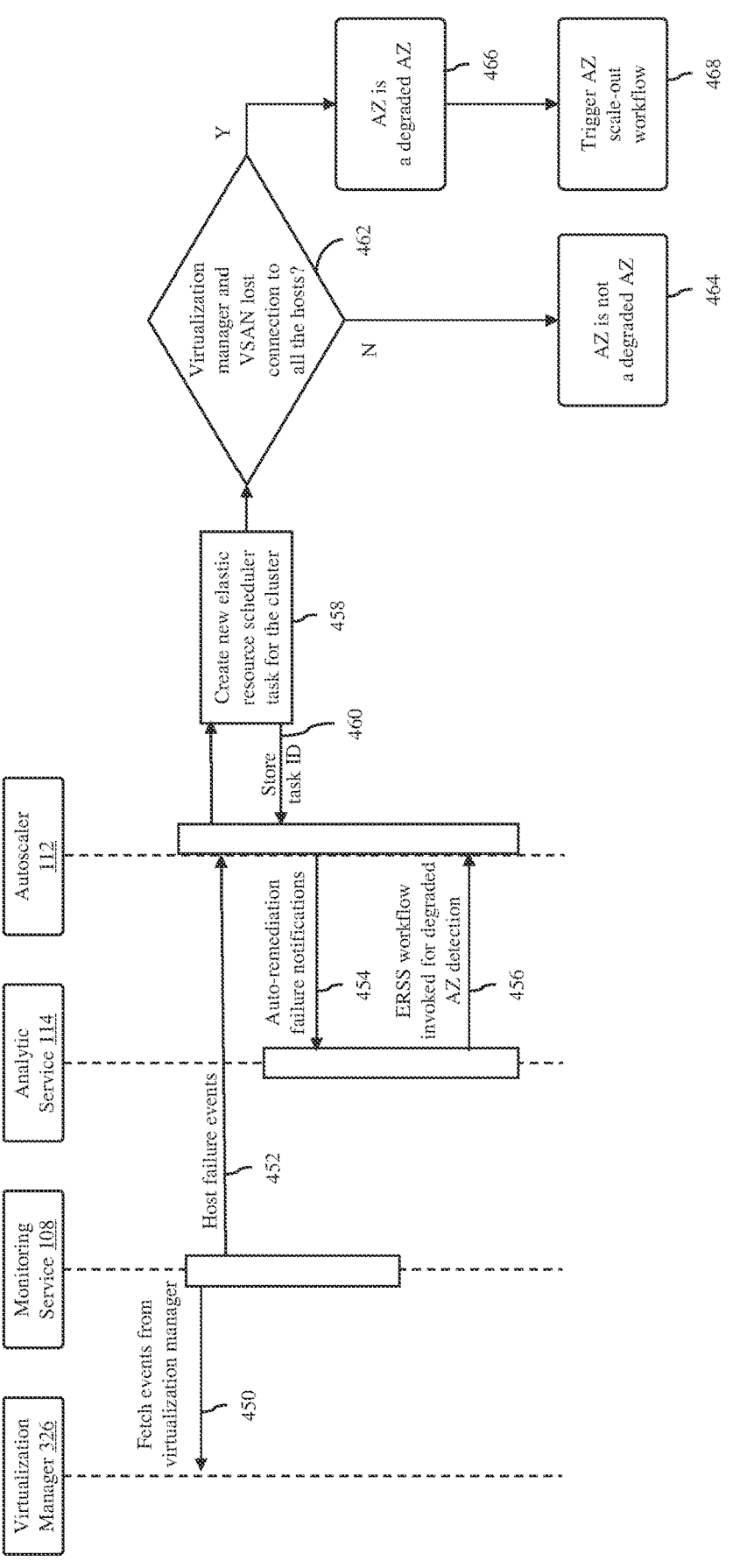
FIG. 4 is a flow diagram of a process of detecting a degraded AZ and scaling out a multi-AZ cluster of a multi-AZ SDDC in accordance with an embodiment of the invention.

Turning now to FIG. 4, a flow diagram of a process of detecting a degraded AZ and scaling out a multi-AZ cluster of a multi-AZ SDDC in accordance with an embodiment of the invention is shown. In this description, the target AZ is the primary availability zone AZ1 shown in FIGS. 3A-3E, and the multi-AZ cluster of the multi-AZ SDDC is the cluster 302 in the multi-AZ SDDC 300 shown in FIGS. 3A-3E.

As indicated by the arrow 450, the process starts with the monitoring service 108 of the cloud management system 104, which fetches events from the virtualization manager 326 in the multi-AZ SDDC 300 via the POS agent 106 operating in the multi-AZ SDDC 300. The events from the virtualization manager 326 may include host failure events with respect to the hosts in the multi-AZ cluster 302 in the target AZ, i.e., the primary availability zone AZ1. In some embodiments, the events are periodically fetched from the virtualization manager 326, for example, every 1 minute. When host failure events are received by the monitoring service 108, the host failure events are transmitted to the autoscaler 112, as indicated by the arrow 452.

In response to the received host failure events, the autoscaler 112 invokes the auto-mediation service 116, which would try to provision or add replacement hosts in the multi-AZ cluster 302 in the same AZ, i.e., the primary availability zone AZ1, as the failed hosts. If the AZ is not degraded, then the provisioning of replacement hosts will be successful. However, if the hosts have failed because the primary availability zone AZ1 is degraded, then the provisioning of replacement hosts will fail. In such a situation, the autoscaler 112 will transmit auto-remediation failure notifications to the analytic service 114, as indicated by the arrow 454.

When the auto-remediation failure notifications are received, the analytic service 114 will suspect that a degraded AZ has been detected since the auto-remediation failure notifications would be for a particular AZ, i.e., the primary availability zone AZ1. That is, the auto-remediation failure notifications would indicate to the analytic service that the primary availability zone AZ1 is potentially a degraded AZ. In response, the analytic service will send a request to the autoscaler 112 for an elastic resource scheduler service (ERSS) workflow for degraded AZ detection, as indicated by the arrow 456. In an embodiment, an application programming interface (API) call for the elastic resource scheduler service may be invoked by the analytic service for degraded AZ detection.

In response to the workflow request, the elastic resource scheduler service 118 of the autoscaler 112 will create a new elastic resource scheduler service task for the multi-AZ cluster 302, as indicated by the block 458. When a new elastic resource scheduler service task is created, a task identification (ID) is generated by the elastic resource scheduler service. This task ID is stored in an elastic resource scheduler service cluster object, which is maintained by the autoscaler 112, as indicated by the arrow 460.

Next, at block 462, a determination is made by the elastic resource scheduler service 118 whether the virtualization manager 326 and the VSAN of the cluster 302 have lost connection to all the hosts of the multi-AZ cluster 302 in the target AZ, i.e., the primary availability zone AZ1. In an embodiment, the virtualization manager may be queried by the elastic resource scheduler service to validate that the virtualization manager has lost connection to all the hosts in the target AZ. In addition, VSAN host health state for all the hosts in the target AZ may be verified as being unhealthy, which indicates that the VSAN has lost connection to all the hosts in the target AZ.

If the determination at block 462 is no, then the elastic resource scheduler service 118 determines that the target AZ, i.e., the primary availability zone AZ1, is not a degraded AZ, i.e., the target AZ is not in a degraded state, at block 464. The process then comes to an end. However, if the determination at block 462 is yes, then the elastic resource scheduler service determines that the target AZ is a degraded AZ, i.e., the target AZ is in a degraded state, at block 466.

Next, at block 468, a scale-out workflow is triggered for the multi-AZ cluster 302 in the other non-degraded AZ, i.e., the secondary availability zone AZ2. The scale-out workflow is described below.

Figure 5:
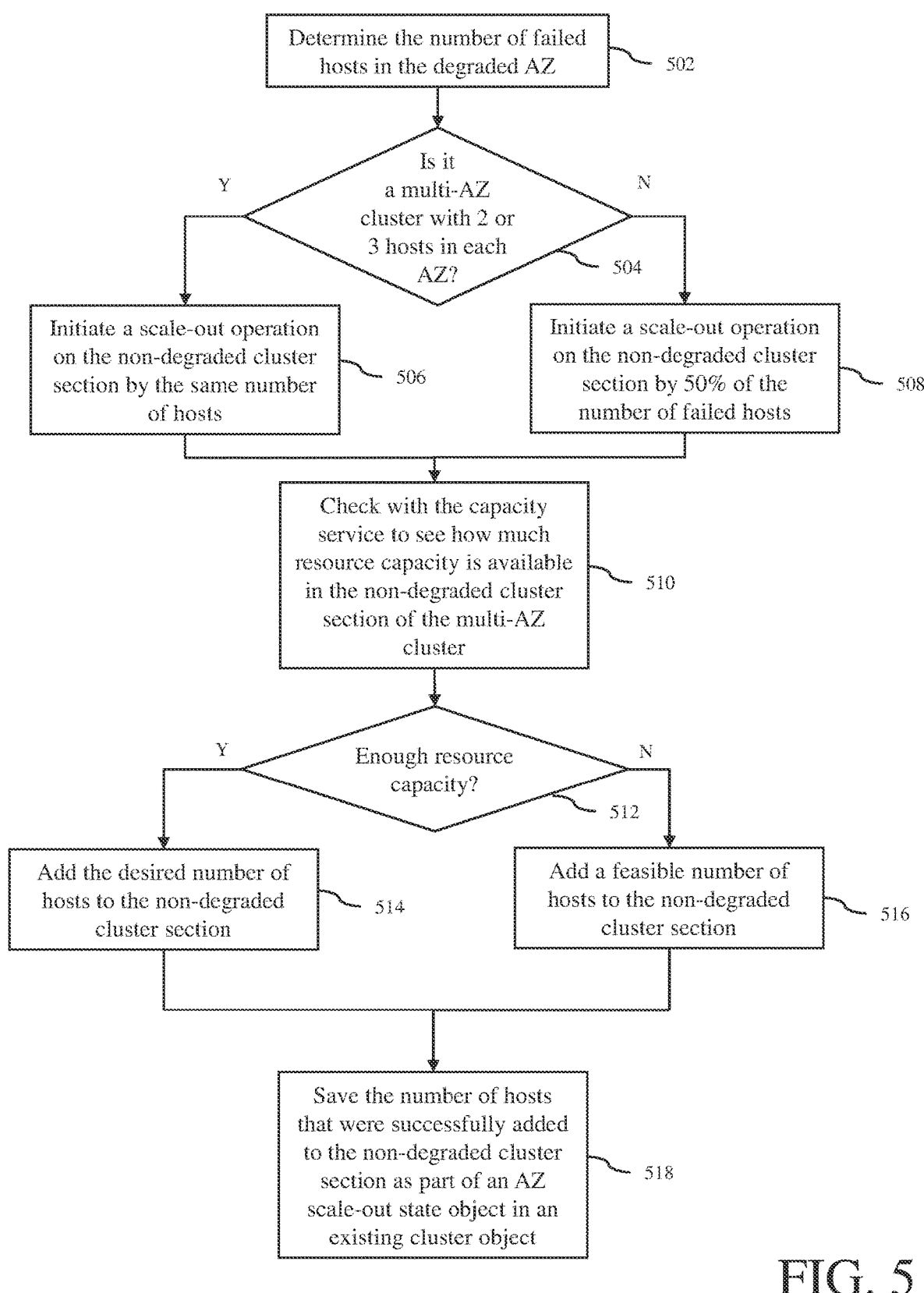
FIG. 5 is a flow diagram of a scale-out workflow for a multi-AZ cluster of a multi-AZ SDDC executed by an elastic resource scheduler service of an autoscaler in the cloud management system when a degraded AZ is detected in accordance with an embodiment of the invention.

A scale-out workflow for a multi-AZ cluster of a multi-AZ SDDC executed by the elastic resource scheduler service 118 of the autoscaler 112 when a degraded AZ is detected in accordance with an embodiment of the invention is described with reference to a flow diagram of FIG. 5. In this description, the degraded AZ is the primary availability zone AZ1 shown in FIGS. 3A-3E, and the multi-AZ cluster of the multi-AZ SDDC is the cluster 302 in the multi-AZ SDDC 300 shown in FIGS. 3A-3E.

The scale-out workflow begins at step 502, where the number of failed hosts of the multi-AZ cluster 302 in the degraded AZ, i.e., the primary availability zone AZ1, is determined. In an embodiment, this number of failed hosts is determined using the host failure events that were transmitted to the autoscaler 112 from the monitoring service 108.

Next, at step 504, a determination is made whether the multi-AZ cluster 302 is a cluster with two (2) or three (3) hosts in each AZ. If the determination is yes, then the workflow proceeds to step 506, where a scale-out operation is initiated on the multi-AZ cluster in the other non-degraded AZ, i.e., the secondary availability zone AZ2, by the same number of hosts as the number of failed hosts in the degraded AZ. However, if the determination is no, then the workflow proceeds to step 508, where a scale-out operation is initiated on the multi-AZ cluster in the other non-degraded AZ by 50% or half of the number of failed hosts in the degraded AZ. Thus, if the number of failed hosts is four (4), then the two (2) hosts are added via a scale-out operation on the multi-AZ cluster in the other non-degraded AZ.

In the multi-AZ cluster 302, there are three (3) hosts in each AZ. Thus, for the multi-AZ cluster 302, a scale-out operation will be initiated in the secondary availability zone AZ2 by three (3) hosts.

Next, at step 510, the capacity service 110 is checked to see how much resource capacity is available in the non-degraded cluster section of the multi-AZ cluster 302, i.e., the cluster section in the secondary availability zone AZ2. In an embodiment, the resource capacity may include the available compute, memory and/or storage resources for the multi-AZ cluster 302 in the secondary availability zone AZ2.

Next, at step 512, a determination is made whether there is enough resource capacity in the non-degraded cluster section of the multi-AZ cluster 302 to add the desired number of hosts for the scale-out operation. If there is enough resource capacity, then the workflow proceeds to step 514, where the desired number of hosts are added to the non-degraded cluster section of the multi-AZ cluster. However, if there is not enough resource capacity, then the workflow proceeds to step 516, where a feasible number of hosts are added to the non-degraded cluster section of the multi-AZ cluster. That is, the maximum number of hosts using the available resource capacity in the non-degraded cluster section of the multi-AZ cluster are added, which would be less than the desired number of hosts.

Next, at step 518, the number of hosts that were successfully added to the non-degraded cluster section of the multi-AZ cluster 302 is saved as part of an AZ scale-out state object in an existing cluster object for the multi-AZ cluster. The process then comes to an end.

An AZ recovery detection and scale-in process executed by the cloud management system 104 in accordance with an embodiment of the invention is described with reference to a flow diagram of FIG. 6. As indicated by block 602, all scale outs of multi-AZ clusters in an AZ and the AZ itself are tracked by the analytic service 114 of the cloud management system. That is, the analytic service keeps track of all the degraded AZs and the multi-AZ cluster scale outs due to the degraded AZs.

At block 604, the degraded AZs are periodically checked by the analytic service 114 for recovery using a sampling process, which executes an AZ recovery workflow for a random multi-AZ cluster. The sampling process is described in detail below.

At block 606, if a multi-AZ cluster that is partially located in a degraded AZ has recently recovered, i.e., the multi-AZ cluster has been successfully scaled out, all the multi-AZ clusters in that AZ are selected for recovery. The assumption is that, if one multi-AZ cluster in a degraded AZ has successfully been scaled out, the degraded AZ has recovered. Thus, all the multi-AZ clusters in the same AZ can now be checked for recovery, and if so, the multi-AZ clusters can be returned to their previous state, which means that the scaled-out cluster sections of the multi-AZ clusters can now be scaled in.

Next, at block 608, for each selected multi-AZ cluster, an AZ recovery workflow is initiated with the elastic resource scheduler service 118 by the analytic service 114. The AZ recovery workflow on a multi-AZ cluster will first determine if the cluster portion of the multi-AZ cluster in the previous degraded AZ has recovered, and if so, initiate a scale-in workflow of the scaled-out cluster portion of the multi-AZ cluster.

Next, at block 610, in response, a verification is performed by the AZ recovery workflow to determine if all the hosts of the cluster section of the multi-AZ cluster in the degraded AZ have fully recovered. In an embodiment, a host is considered to have fully recovered if the host is connected to its respective virtualization manager and the state of the host is deemed to be healthy by the virtualization manager.

Next, at block 612, on successful verification, a scale-in workflow is triggered by the elastic resource scheduler service 118 to remove all the previously added hosts in the multi-AZ cluster.

Next, at block 614, on completion of the scale-in workflow, the analytic service 114 is notified of the successful recovery of the multi-AZ cluster by the elastic resource scheduler service 118. The AZ recovery workflow is described in more detail below with reference to FIG. 7, while the scale-in workflow is described in more detail below with reference to FIG. 8.

Next, at block 616, the successful recovery of the multi-AZ cluster is recorded by the analytic service 114. This AZ recovery detection and scale-in process is an on-going process, which is continuously performed as AZs degrade and recover.

Figure 7:
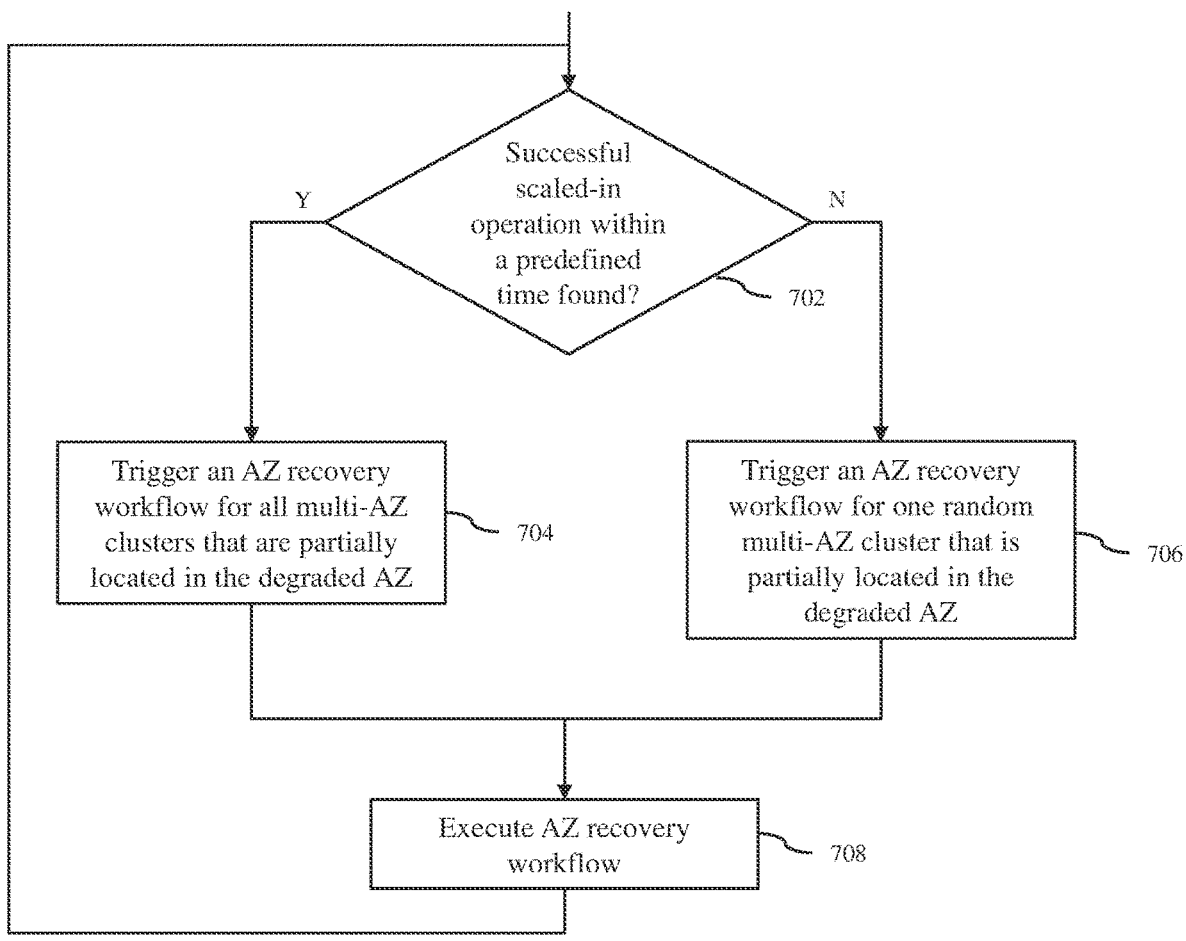
FIG. 7 is a flow diagram of a sampling process executed by an analytic service of the cloud management system in accordance with an embodiment of the invention.

A sampling process executed by the analytic service 114 in accordance with an embodiment of the invention is described with reference to a flow diagram of FIG. 7. The sampling process begins at step 702, where a determination is made whether a successful scale-in operation on a previously scaled-out multi-AZ cluster due to a degraded AZ has been found within a predefined period of time, e.g., within the last hour.

If a successful scale-in operation has been found, the process proceeds to step 704, where an AZ recovery workflow is triggered for all multi-AZ clusters that are partially located in the degraded AZ. The process then proceeds to step 708, where an AZ recover workflow is executed on each of the multi-AZ clusters that are partially located in the degraded AZ. The workflow on the different multi-AZ clusters may be executed in parallel.

However, if a successful scale-in operation has not been found, the process proceeds to step 706, where an AZ recovery workflow is triggered for a random multi-AZ cluster that is partially located in the degraded AZ to see if the degraded AZ has now recovered. The process then proceeds to step 708, where an AZ recovery workflow is executed on the random multi-AZ cluster. The AZ recovery workflow is described in more detail below.

The process then proceeds back to step 702 to repeat the process. In an embodiment, the sampling process may be repeated at set time intervals, such as every 30 minutes, by the analytic service 114.

Figure 8:
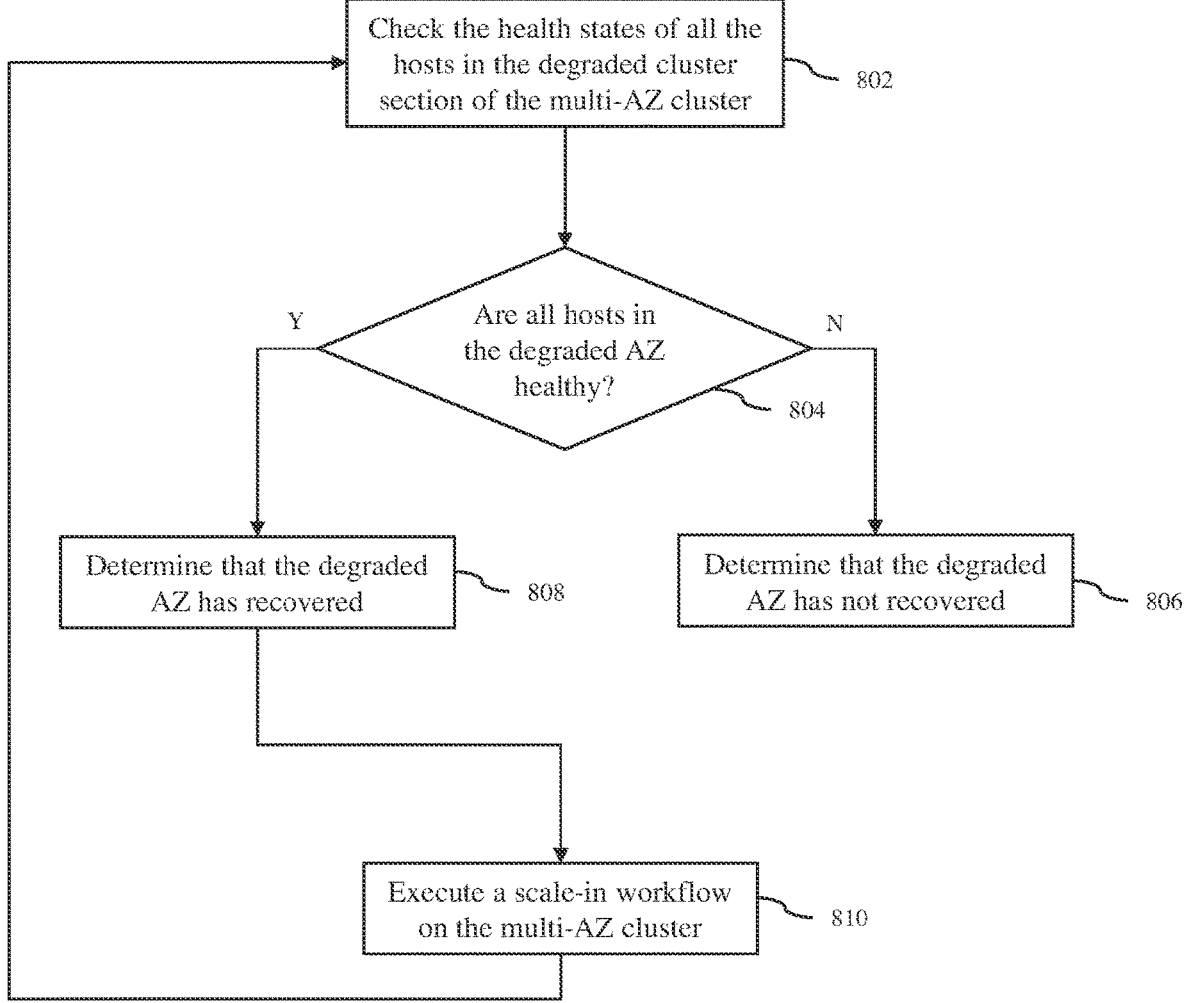
FIG. 8 is a flow diagram of an AZ recovery workflow executed by the autoscaler for a multi-AZ cluster of a multi-AZ SDDC in a degraded AZ in accordance with an embodiment of the invention.

An AZ recovery workflow executed by the autoscaler 112 for a multi-AZ cluster of a multi-AZ SDDC in a degraded AZ in accordance with an embodiment of the invention is described with reference to a flow diagram of FIG. 8. In this description, the degraded AZ is the primary availability zone AZ1 shown in FIGS. 3A-3E, and the multi-AZ cluster of the multi-AZ SDDC is the cluster 302 in the multi-AZ SDDC 300 shown in FIGS. 3A-3E.

The AZ recovery workflow begins at step 802, where the health states of all the hosts 304A in the degraded cluster section of the multi-AZ cluster 302 is checked. In an embodiment, the autoscaler 112 communicates with the virtualization manager 326 in the multi-AZ SDDC 300 to determine whether the hosts 304A in the degraded cluster section of the multi-AZ cluster are healthy or unhealthy using the host health states, which are maintained by the virtualization manager 326. In an embodiment, a host may be deemed to be healthy if the host is connected to the virtualization manager and software and hardware components of the hosts are functioning within prescribed parameters.

Next, at step 804, a determination is made whether all the hosts 304A in the degraded cluster section of the multi-AZ cluster 302 are healthy. If all the hosts 304A are not healthy, then the workflow proceeds to step 806, where it is determined that the degraded AZ, i.e., the primary availability zone AZ1, has not recovered. However, if all the hosts 304A are healthy, then the workflow proceeds to step 808, where it is determined that the degraded AZ, i.e., the primary availability zone AZ1, has recovered. That is, the state of the primary availability zone AZ1 is determined to be in a recovered state, i.e., a normal state after a degraded state.

Next, at step 810, a scale-in workflow is executed on the multi-AZ cluster 302 to remove at least some of the hosts from the previously scaled-out cluster section of the multi-AZ cluster. The scale-in workflow is described below.

Figure 9:
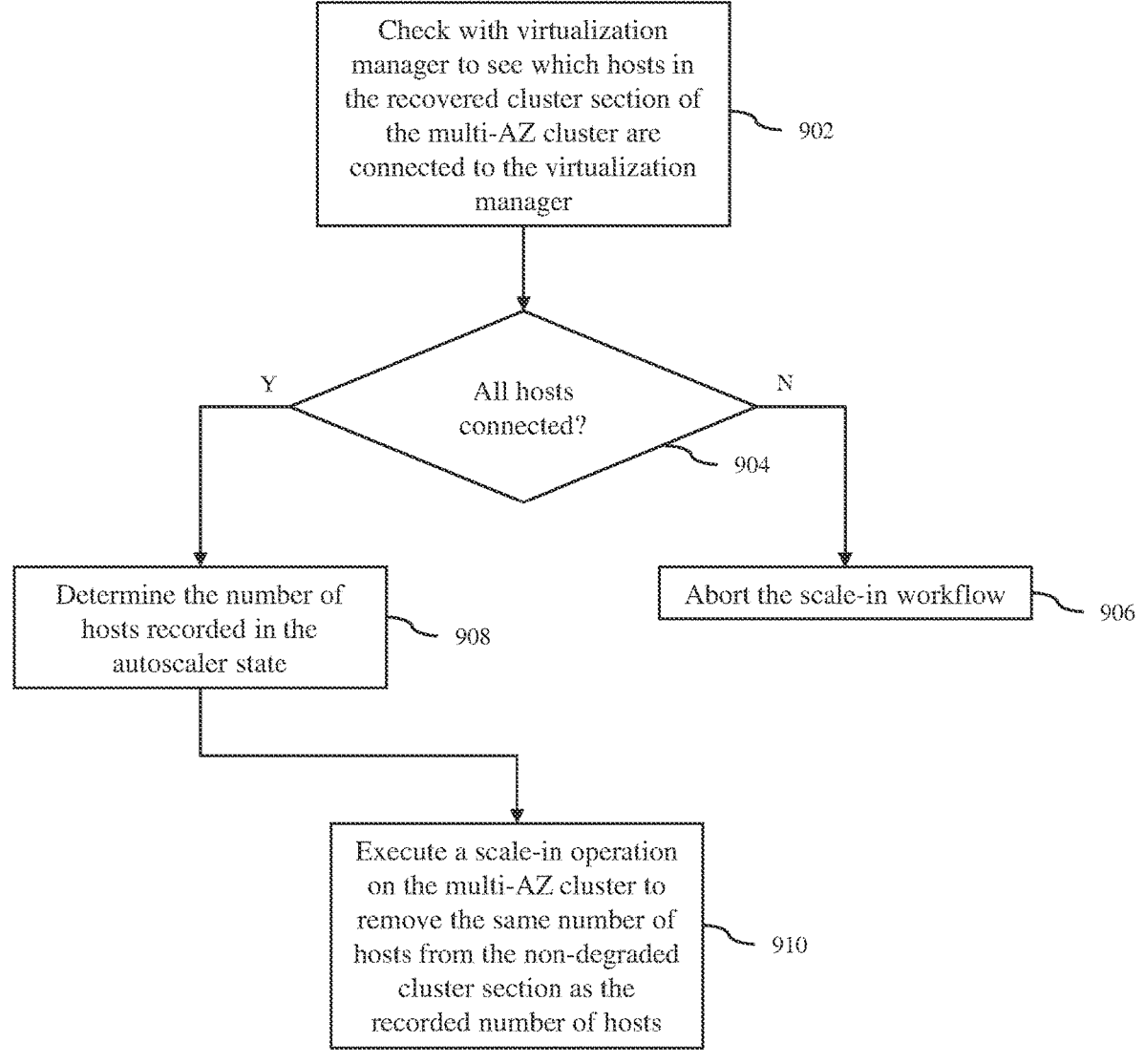
FIG. 9 is a flow diagram of a scale-in workflow for a multi-AZ cluster of a multi-AZ SDDC executed by the elastic resource scheduler service of the autoscaler when a recovered AZ is detected in accordance with an embodiment of the invention.

A scale-in workflow for a multi-AZ cluster of a multi-AZ SDDC executed by the elastic resource scheduler service 118 of the autoscaler 112 when a recovered AZ is detected in accordance with an embodiment of the invention is described with reference to a flow diagram of FIG. 9. In this description, the recovered AZ is the primary availability zone AZ1 shown in FIGS. 3A-3E, and the multi-AZ cluster of the multi-AZ SDDC is the cluster 302 in the multi-AZ SDDC 300 shown in FIGS. 3A-3E.

The scale-in workflow begins at step 902, where the virtualization manager 326 of the multi-AZ SDDC 300 is checked to see which hosts in the recovered cluster section of the multi-AZ cluster 302, i.e., the part of the multi-AZ cluster in the primary availability zone AZ1, are connected to the virtualization manager.

Next, at step 904, a determination is made whether all the hosts in the recovered cluster section of the multi-AZ cluster 302 are connected to the virtualization manager 326. If not all the hosts are connected, then the workflow proceeds to step 906, where the scale-in workflow is aborted. However, if all the hosts are connected, then the workflow proceeds to step 908, where the number of hosts recorded in the autoscaler state is determined. This number of hosts is the number of hosts that were added to the other non-degraded cluster section of the multi-AZ cluster, i.e., the part of the cluster in the secondary availability zone AZ2, during the previous scale-out operation when the primary availability zone AZ1 was detected as being in a degraded state.

Next, at step 910, a scale-in operation is executed on the multi-AZ cluster 302 to remove the same number of hosts from the non-degraded cluster section of the multi-AZ cluster as the recorded number of hosts. In other embodiments, the scale-in operation may remove less than the recorded number of host from the non-degraded cluster section of the multi-AZ cluster. The process then comes to an end.

A computer-implemented method for managing multi-AZ clusters of host computers in a cloud computing environment, in accordance with an embodiment of the invention is described with reference to a process flow diagram of FIG. 10. At block 1002, a degraded state of a first AZ in the cloud computing environment is automatically detected based on host failure events for host computers in a first cluster section of a multi-AZ cluster of host computers located in the first AZ. At block 1004, a second cluster section of the multi-AZ cluster of host computers located in a second AZ is scaled out in response to the detecting of the degraded state of the first AZ. At block 1006, a recovered state of the first AZ is automatically detected based a successful scale-in operation of another multi-AZ cluster located partially in the first AZ. At block 1008, the second cluster section of the multi-AZ cluster of host computers located in the second AZ is scaled in in response to the detecting of the recovered state of the first AZ.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infra-red, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, compo-nents, structures, and/or functions are described in no more detail than to enable the various embodiments of the inven-tion, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing multi-availability zone (AZ) clusters of host computers in a cloud computing environment, the method comprising:

automatically detecting a degraded state of a first AZ in the cloud computing environment having a first cluster section of a multi-AZ cluster of host computers located in the first AZ;

scaling out a second cluster section of the multi-AZ cluster of host computers located in a second AZ in response to the detecting of the degraded state of the first AZ;

automatically detecting a recovered state of the first AZ, wherein automatically detecting the recovered state of the first AZ includes selecting a random multi-AZ cluster located partially in the first AZ to execute a recovery workflow on the random multi-AZ cluster, wherein the recovery workflow includes checking health states of all host computers in a section of the random multi-AZ cluster that is located in the first AZ to determine whether the first AZ has recovered; and scaling in the second cluster section of the multi-AZ cluster of host computers located in the second AZ in response to the detecting of the recovered state of the first AZ.

2. The computer-implemented method of claim 1, wherein automatically detecting the degraded state of the first AZ includes receiving an auto-remediation failure noti-fication of a replacement host computer being unable to be provisioned in a first cluster section of the multi-AZ cluster of host computers located in the first AZ, wherein the auto-remediation failure notification indicates that the first AZ is potentially a degraded AZ.

3. The computer-implemented method of claim 2, wherein automatically detecting the degraded state of the first AZ includes determining that the first AZ is a degraded AZ when a virtualization manager for the multi-AZ cluster of host computers has lost connection to all the hosts in the first cluster section of the multi-AZ cluster of host comput-ers located in the first AZ.

4. The computer-implemented method of claim 1, wherein scaling out the second cluster section of the multi-AZ cluster of host computers located in the second AZ includes adding a number of new host computers to the second cluster section of the multi-AZ cluster of host computers, wherein the number of new host computers equals a number of host computers in the first cluster section of the multi-AZ cluster of host computers located in the first AZ when each of the first and cluster sections of the multi-AZ cluster of host computers includes two or three host computers.

5. The computer-implemented method of claim 1, wherein scaling out the second cluster section of the multi-AZ cluster of host computers located in the second AZ includes adding a number of new host computers to the second cluster section of the multi-AZ cluster of host computers, wherein the number of new host computers equals half of a number of host computers in the first cluster section of the multi-AZ cluster of host computers located in the first AZ when each of the first and cluster sections of the multi-AZ cluster of host computers includes more than three host computers.

6. The computer-implemented method of claim 1 wherein the recovery workflow further includes determining that the first AZ has recovered when the health states of all the host computers in the section of the random multi-AZ cluster that is located in the first AZ are healthy.

7. The computer-implemented method of claim 6, wherein scaling in the second cluster section of the multi-AZ cluster of host computers located in the second AZ is part of scaling in all multi-AZ clusters of host computers located partially in the first AZ based the successful scale-in opera-tion of the another multi-AZ cluster located partially in the first AZ.

8. The computer-implemented method of claim 1, wherein scaling in the second cluster section of the multi-AZ cluster of host computers located in the second AZ includes removing a number of host computers in the second cluster section of the multi-AZ cluster of host computers, wherein the number of host computers removed is equal to a number of host computers that were added to the second cluster section of the multi-AZ cluster of host computers located in the second AZ during the scaling out.

9. A non-transitory computer-readable storage medium containing program instructions for auto or managing multi-availability zone (AZ) clusters of host computers in a cloud computing environment, wherein execution of the program instructions by one or more processors causes the one or more processors to perform steps comprising:

automatically detecting a degraded state of a first AZ in the cloud computing environment having a first cluster section of a multi-AZ cluster of host computers located in the first AZ, wherein automatically detecting the recovered state of the first AZ includes selecting a random multi-AZ cluster located partially in the first AZ to execute a recovery workflow on the random multi-AZ cluster, wherein the recovery workflow includes checking health states of all host computers in a section of the random multi-AZ cluster that is located in the first AZ to determine whether the first AZ has recovered;

scaling out a second cluster section of the multi-AZ cluster of host computers located in a second AZ in response to the detecting of the degraded state of the first AZ;

automatically detecting a recovered state of the first AZ; and scaling in the second cluster section of the multi-AZ cluster of host computers located in the second AZ in response to the detecting of the recovered state of the first AZ.

10. The non-transitory computer-readable storage medium of claim 9, wherein automatically detecting the degraded state of the first AZ includes receiving an auto-remediation failure notification of a replacement host computer being unable to be provisioned in a first cluster section of the multi-AZ cluster of host computers located in the first AZ, wherein the auto-remediation failure notification indicates that the first AZ is potentially a degraded AZ.

11. The non-transitory computer-readable storage medium of claim 10, wherein automatically detecting the degraded state of the first AZ includes determining that the first AZ is a degraded AZ when a virtualization manager for the multi-AZ cluster of host computers has lost connection to all the hosts in the first cluster section of the multi-AZ cluster of host computers located in the first AZ.

12. The non-transitory computer-readable storage medium of claim 9, wherein scaling out the second cluster section of the multi-AZ cluster of host computers located in the second AZ includes adding a number of new host computers to the second cluster section of the multi-AZ cluster of host computers, wherein the number of new host computers equals a number of host computers in the first cluster section of the multi-AZ cluster of host computers located in the first AZ when each of the first and cluster sections of the multi-AZ cluster of host computers includes two or three host computers.

13. The non-transitory computer-readable storage medium of claim 9, wherein scaling out the second cluster section of the multi-AZ cluster of host computers located in the second AZ includes adding a number of new host computers to the second cluster section of the multi-AZ cluster of host computers, wherein the number of new host computers equals half of a number of host computers in the first cluster section of the multi-AZ cluster of host computers located in the first AZ when each of the first and cluster sections of the multi-AZ cluster of host computers includes more than three host computers.

14. The non-transitory computer-readable storage medium of claim 9, wherein the recovery workflow further includes determining that the first AZ has recovered when the health states of all the host computers in the section of the random multi-AZ cluster that is located in the first AZ are healthy.

15. The non-transitory computer-readable storage medium of claim 14, wherein scaling in the second cluster section of the multi-AZ cluster of host computers located in the second AZ is part of scaling in all multi-AZ clusters of host computers located partially in the first AZ based the successful scale-in operation of the another multi-AZ cluster located partially in the first AZ.

16. The non-transitory computer-readable storage medium of claim 9, wherein scaling in the second cluster section of the multi-AZ cluster of host computers located in the second AZ includes removing a number of host computers in the second cluster section of the multi-AZ cluster of host computers, wherein the number of host computers removed is equal to a number of host computers that were added to the second cluster section of the multi-AZ cluster of host computers located in the second AZ during the scaling out.

17. A system comprising:

memory; and at least one processor configured to:

automatically detect a degraded state of a first availability zone (AZ) in a cloud computing environment having a first cluster section of a multi-AZ cluster of host computers located in the first AZ;

scale out a second cluster section of the multi-AZ cluster of host computers located in a second AZ in response to the detecting of the degraded state of the first AZ;

automatically detect a recovered state of the first AZ, wherein automatically detecting the recovered state of the first AZ includes selecting a random multi-AZ cluster located partially in the first AZ to execute a recovery workflow on the random multi-AZ cluster, wherein the recovery workflow includes checking health states of all host computers in a section of the random multi-AZ cluster that is located in the first AZ to determine whether the first AZ has recovered; and scale in the second cluster section of the multi-AZ cluster of host computers located in the second AZ in response to the detecting of the recovered state of the first AZ.

18. The system of claim 17, wherein automatically detecting the degraded state of the first AZ includes receiving an auto-remediation failure notification of a replacement host computer being unable to be provisioned in a first cluster section of the multi-AZ cluster of host computers located in the first AZ, wherein the auto-remediation failure notification indicates that the first AZ is potentially a degraded AZ.

19. The system of claim 17, wherein automatically detecting the degraded state of the first AZ includes determining that the first AZ is a degraded AZ when a virtualization manager for the multi-AZ cluster of host computers has lost connection to all the hosts in the first cluster section of the multi-AZ cluster of host computers located in the first AZ.

20. The system of claim 17, wherein scaling out the second cluster section of the multi-AZ cluster of host computers located in the second AZ includes adding a number of new host computers to the second cluster section of the multi-AZ cluster of host computers, wherein the number of new host computers equals a number of host computers in the first cluster section of the multi-AZ cluster of host computers located in the first AZ when each of the first and cluster sections of the multi-AZ cluster of host computers includes two or three host computers.

* * * * *